United States Patent
Krauss

(10) Patent No.: US 11,082,523 B2
(45) Date of Patent: Aug. 3, 2021

(54) SYSTEM, METHOD AND COMPUTER PROGRAM PRODUCT FOR A DISTRIBUTED VIRTUAL ADDRESS SPACE

(71) Applicant: International Business Machines Corporation, Armonk, NY (US)

(72) Inventor: Kirk J. Krauss, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

(21) Appl. No.: 15/428,322

(22) Filed: Feb. 9, 2017

(65) Prior Publication Data
US 2018/0227264 A1 Aug. 9, 2018

(51) Int. Cl.
| | |
|---|---|
| G06F 12/10 | (2016.01) |
| G06F 13/42 | (2006.01) |
| G06F 13/40 | (2006.01) |
| G06F 15/16 | (2006.01) |
| G06F 3/06 | (2006.01) |
| G06F 12/06 | (2006.01) |
| G06F 12/00 | (2006.01) |
| H04L 29/08 | (2006.01) |
| G06F 12/1072 | (2016.01) |

(52) U.S. Cl.
CPC ........ H04L 67/303 (2013.01); G06F 12/1072 (2013.01); H04L 67/1097 (2013.01); *G06F 2212/1032* (2013.01); *G06F 2212/1041* (2013.01); *G06F 2212/154* (2013.01); *G06F 2212/163* (2013.01)

(58) Field of Classification Search
CPC .... H04L 67/303; H04L 67/1097; G06F 12/00
USPC ........................................................ 709/226
See application file for complete search history.

(56) References Cited

U.S. PATENT DOCUMENTS

| | | | | |
|---|---|---|---|---|
| 6,502,099 | B1* | 12/2002 | Rampy | G06F 9/541 |
| 6,785,783 | B2* | 8/2004 | Buckland | G06F 11/2058 |
| | | | | 711/153 |
| 7,401,112 | B1* | 7/2008 | Matz | G06F 9/5038 |
| | | | | 379/265.02 |

(Continued)

FOREIGN PATENT DOCUMENTS

| | | |
|---|---|---|
| CN | 101990004 A | 3/2013 |
| CN | 103475732 A | 12/2013 |

OTHER PUBLICATIONS

Mel, et al. "The NIST Definition of Cloud Computing". Recommendations of the National Institute of Standards and Technology. Nov. 16, 2015.

(Continued)

*Primary Examiner* — Kevin T Bates
*Assistant Examiner* — Golam Mahmud
(74) *Attorney, Agent, or Firm* — Samuel Waldbaum, Esq.; McGinn I.P. Law Group, PLLC.

(57) ABSTRACT

A virtual memory management method, system, and computer program product at a first machine, receiving a request to access memory associated with a virtual address, at the first machine, initiating a translation of the virtual address to a logical address, during the translation of the virtual address to the logical address, determining that a machine identifier corresponds to a second machine, communicating the request to access the memory to the second machine, and at the second machine, fulfilling the memory access request.

17 Claims, 6 Drawing Sheets

(56) References Cited

U.S. PATENT DOCUMENTS

| | | | |
|---|---|---|---|
| 7,454,764 B2* | 11/2008 | Goyal | G06F 8/10 717/136 |
| 7,734,890 B2 | 6/2010 | Morris | |
| 8,914,720 B2* | 12/2014 | Harrington | G06F 40/131 715/254 |
| 9,262,094 B2* | 2/2016 | Kisley | G06F 13/385 |
| 9,648,102 B1* | 5/2017 | Davis | H04L 67/1097 |
| 10,095,543 B1* | 10/2018 | Griffin | G06F 12/0862 |
| 2002/0169938 A1* | 11/2002 | Scott | G06F 12/1072 711/207 |
| 2005/0027947 A1 | 2/2005 | Landin | |
| 2005/0044340 A1* | 2/2005 | Sheets | G06F 12/1072 711/206 |
| 2005/0193169 A1* | 9/2005 | Ahluwalia | G06F 12/1009 711/115 |
| 2006/0271706 A1 | 11/2006 | Dugan et al. | |
| 2007/0180041 A1* | 8/2007 | Suzuoki | H04L 67/1097 709/207 |
| 2009/0089537 A1* | 4/2009 | Vick | G06F 12/1072 711/203 |
| 2011/0087858 A1* | 4/2011 | Persson | G06F 12/1027 711/206 |
| 2014/0164732 A1* | 6/2014 | Muff | G06F 12/1045 711/207 |
| 2015/0067819 A1* | 3/2015 | Shribman | H04L 67/2838 726/12 |
| 2015/0249573 A1 | 9/2015 | Miller et al. | |
| 2015/0277763 A1* | 10/2015 | Zhou | G06F 3/0683 711/105 |
| 2016/0173338 A1* | 6/2016 | Wolting | H04L 67/1097 709/223 |
| 2016/0188628 A1 | 6/2016 | Hartman et al. | |
| 2016/0210080 A1* | 7/2016 | Frank | G06F 3/0632 |
| 2016/0283303 A1* | 9/2016 | Sharma | G06F 11/0772 |
| 2016/0283399 A1* | 9/2016 | Das Sharma | G06F 13/4022 |
| 2016/0315874 A1* | 10/2016 | Medovich | H04L 61/2503 |
| 2016/0344731 A1* | 11/2016 | Serebrin | G06F 12/1475 |
| 2017/0031835 A1* | 2/2017 | Serebrin | G06F 12/1081 |
| 2017/0147346 A1* | 5/2017 | Hornung | G06F 9/3806 |
| 2018/0011651 A1* | 1/2018 | Sankaran | G06F 3/0665 |
| 2018/0019006 A1* | 1/2018 | Brandl | G11C 11/408 |
| 2018/0089098 A1* | 3/2018 | Guim Bernat | G06F 12/10 |
| 2018/0101480 A1* | 4/2018 | Abhishek Raja | G06F 12/1009 |

OTHER PUBLICATIONS

Lu, X., Wang, H., Wang, J. et al. (2013). "Internet-based virtual computing environment: beyond the data center as a computer". Future Generation Computer Systems, 29(1), 309-322.

* cited by examiner

SYSTEM, METHOD AND COMPUTER PROGRAM PRODUCT FOR A DISTRIBUTED VIRTUAL ADDRESS SPACE

BACKGROUND

The present invention relates generally to a virtual memory management method applicable to a cloud computing environment, and more particularly, but not by way of limitation, to a system, method, and computer program product for performing address translation where a node identifier is part of a virtual address.

Conventional distributed systems can provide for memory to be shared by processor nodes. Examples include Non-Uniform Memory Access (NUMA) and multi-channel memory architectures. Processes that run on these conventional systems can address memory on any of the nodes. However, for any given memory block, processes have no control or even awareness of which node physically stores the block; plus blocks can move from node to node solely at the discretion of the underlying operating system. This can impact the performance of software that might have benefited from deciding for itself how to place blocks based on frequency of access or some other metric.

Furthermore, with the arrival of the greater than 300 GB/s local area network data rates available with current technologies such as InfiniBand EDR, parallel systems can be designed using off-the-shelf components that interact with memory across all nodes at a significant fraction of front-side bus speeds. However, for such parallel systems to scale, a way to address memory on any node is needed, whether it is bus-connected or network-connected. Current NUMA and multi-channel memory architectures are limited to bus-connected systems, which are typically not scalable to the large number of nodes that can be available to network-connected systems. Scalability limits the use of these architectures.

Thus, there is a need in the art for a technique to solve both of the above problems, in a practical way, taking into account a further fact about the current state of the art. That is, current 64-bit operating systems use only a portion of the available address bits for addressing. Most of the remaining bits can be used for the purpose contemplated here.

SUMMARY

In an exemplary embodiment, the present invention can provide a computer-implemented virtual memory management method, the method including at a first machine, receiving a request to access memory associated with a virtual address, at the first machine, initiating a translation of the virtual address to a logical address, during the translation of the virtual address to the logical address, determining that a machine identifier corresponds to a second machine, communicating the request to access the memory to the second machine, and at the second machine, fulfilling the memory access request. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
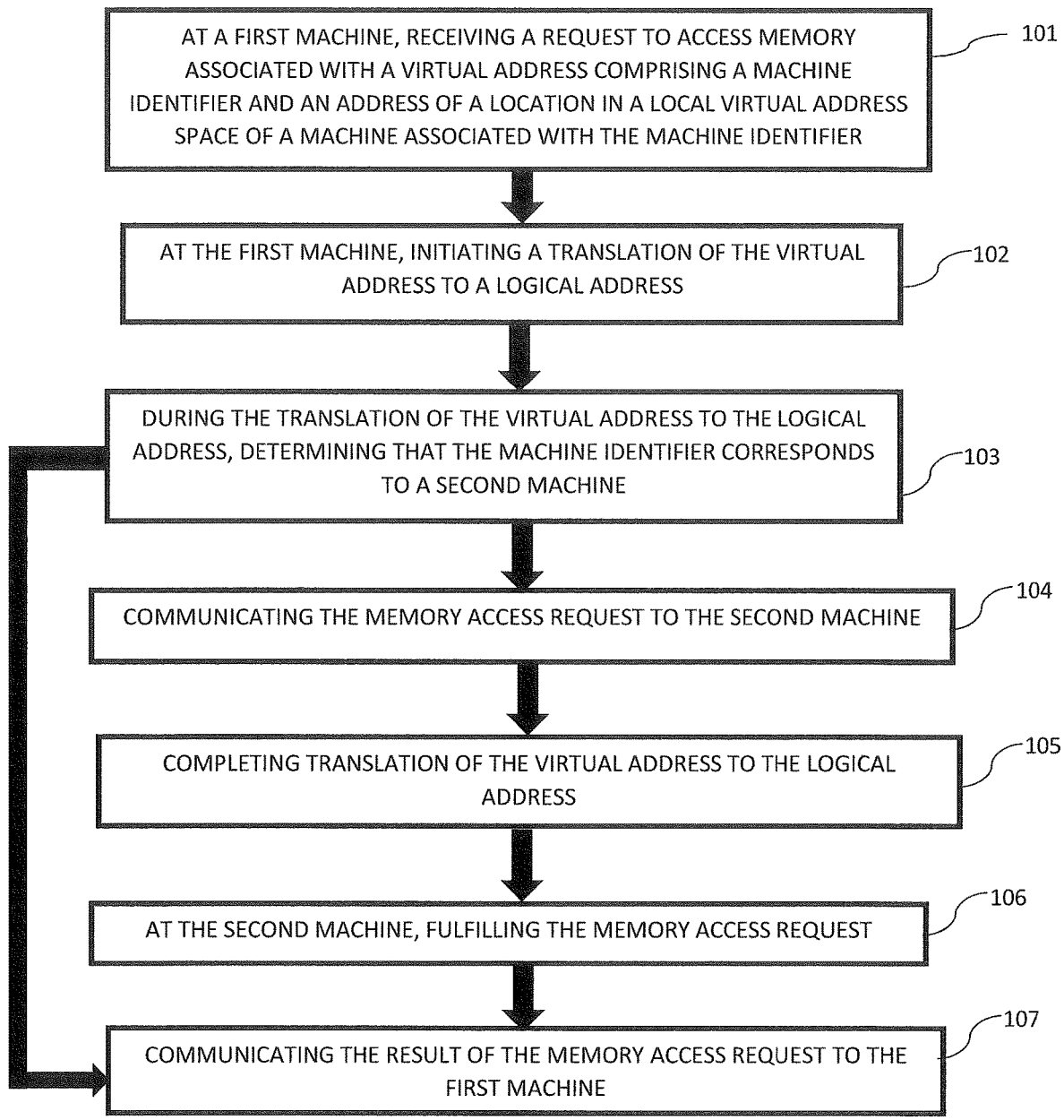
FIG. 1 exemplarily shows a high-level flow chart for a virtual memory management method 100 according to an embodiment of the present invention.

The invention will now be described with reference to FIGS. 1-6, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a virtual memory management method 100 according to the present invention can include various steps for a distributed application assigned a virtual address space spanning multiple nodes. Lower-order bits of a virtual address can reflect a virtual address on one of the nodes. A portion of the higher-order bits can serve as a node identifier. All nodes can agree on the correspondence between the node identifiers and the nodes, so that any component of the distributed application can access any memory location at a virtual address that is consistent for all nodes. By way of introduction of the example depicted in FIG. 2, one or more computers of a computer system 12 according to an embodiment of the present invention can include a memory 28 having instructions stored in a storage system to perform the steps of FIG. 1.

Referring now generally to the embodiments of the invention, the bits of a virtual address can include both a node identifier and the bits corresponding to a virtual memory location addressable on the identified node. The bits can be broken out into bits reserved for operating system use, bits that serve for node identification, and the bits of an address in virtual memory that is addressable by the operating system. For example, on a set of 64-bit GNU Linux platforms comprising a distributed system, a virtual address might include a portion reserved for kernel use, a node identifier, and a virtual address on designated node.

On GNU Linux, up to 14 bits may serve to store node identifiers, allowing the distributed system to scale to about 16 000 nodes.

Address translation can be performed at the hardware, operating system, hypervisor, or application layer. If the translation occurs at the operating system layer without hardware or other assistance, the software initiating address translation can check the node identifier bits prior to passing a virtual address to the hardware for translation on the local machine. If the translation occurs with hardware or cloud-based assistance, a hardware address translation unit, or a service operating in a cloud-computing environment to perform address translation, can check the node identifier bits and can flag a condition, such as an interrupt, if the node identifier designates a node other than the local machine.

With either technique, when memory on another node is to be accessed, an inter-node memory access routine, such as a service routine, can pass the memory access request to the designated node. This can be done in a few different ways, depending on how the nodes are connected. For example, the routine may communicate the memory access request using Ethernet protocol. The routine also may rely on other network communications protocols, such as but not limited to Internet Protocol (IP), Open Systems Interconnection (OSI), Systems Network Architecture (SNA), Transmission Control Protocol (TCP), User Datagram Protocol (UDP), or a bus network protocol such as but not limited to HyperTransport, InfiniBand, QuickPath Interconnect, NVLink, Direct Media Interface, or any combination thereof.

On the receiving end, another routine, such as another interrupt service routine, and/or a per-node memory access listener routine, and/or a service operating in a cloud-computing environment executing a memory access listener routine, can be invoked to fulfill the memory access request. If a memory read has been performed, that routine can pass result back to the originating node, for example, via Ethernet protocol once again. Hardware-assisted arrangements may be made to perform most or all of the duties of handling a memory access request received at a node via Ethernet or other inter-node communication methods.

Applications can be aware of which nodes contain which memory blocks, by checking their virtual addresses. If all or part of address translation is performed at the application level, then a scenario is to perform all of the translation steps at the node that requests access and to then pass a physical memory address across the wire to complete the request at the designated node, without invoking any application software on that node. This saves the overhead of bubbling up the request all the way to the application layer on that node. Service routines or the like could access memory at the receiving end of these requests.

When memory blocks are "swapped out" (changed from physical-memory-resident to media-resident), they can be stored local to the node on which they reside, or on a storage device shared between nodes. Either way, when a node needs to access a swapped out block, that block can be swapped into physical memory directly attached to the node performing the access. Any cache of node identification bits associated with that block can be updated accordingly. Embodiments that provide for caching of node identification bits can include logic for updating any such cache when a block is relocated from node to node.

Relocating a block from node to node can include both copying the block's content and reflecting its location in any virtual address that references it at the application level. This need not involve non-portable logic or swapping operations. A call to the standard C library's realloc( ) routine returns a pointer to a block. If the underlying operating system were to move the block between nodes at realloc( ) time, then the resulting virtual address could include the updated node identifier. In other words, most existing code that expects a block to move within virtual memory can still work, given the distributed virtual address space described here.

Routines that access memory across node boundaries can wait for the accesses to complete. This will typically take longer than accesses to local memory. To keep these accesses safe from corruption via race conditions, a distributed set of one or more locks (synchronization objects) can serve to protect all inter-node accesses.

As an alternative, a shared memory model can be used, such that even for objects that share a distributed address space, an object local to one node cannot access memory on another node unless it gains access via an API call or the like. That way, the objects can work with their local memory, across all nodes, in safety until they are ready to share it. Then, and only then, would other synchronization measures be needed.

Similarly, if multiple distributed applications are running on the distributed system, they can share memory across nodes. Address translation can work as at would for prior art systems, where the two applications may map a single logical address to differing virtual addresses. The node identifiers can be common to all applications. In other embodiments, they may be different, so long as the address translation mechanism can translate them as well.

Because distributed systems often provide for redundancy in case of node failure, redundancy can be provided by associating a single node identifier with multiple redundant nodes. The necessary logic to make writes (at least) redundant would need to be implemented in the service routines described above. These routines could designate primary and backup nodes, for read purposes, where the primary node is the only one that need be accessed at memory read time. A node failure might be determined based on, for example, a too-lengthy inter-node read cycle (i.e., a timeout could serve to redirect the read request to a backup node). The node failure can be communicated throughout the system, so that it can generally switch from the primary node to a backup node with a node identifier matching that of the failed primary node.

Referring now to FIG. 1, in step 101, at a first machine, a request to access memory associated with a virtual address is received. The virtual address includes a machine identifier and an address of a location in a local virtual address space of a machine associated with the machine identifier.

In step 102, at the first machine, a translation of the virtual address to a logical address is initiated.

In step 103, during the translation of the virtual address to the logical address in step 102, determining that the machine identifier corresponds to a second machine. If the machine identifier designates the first machine, then any necessary address translation can take place entirely on the first machine, and processing can continue at step 107.

In step 104, the memory access request is communicated to the second machine.

In step 105, the translation of the virtual address to the logical address is completed.

In step 106, at the second machine, the memory access request is fulfilled.

In step 107, the result of the memory access request is communicated to the first machine.

Thus, steps 101-107 involve a distributed virtual address space for a distributed process. The steps 101-107 perform address translation where a node identifier is part of a virtual address. Every node that executes threads of the process agrees on the identity of every other node, so that the entire address space is accessible across all of the nodes via a set of virtual addresses consistent across all of the nodes. Address translation can involve a request from one node to read from or write to memory resident on another node, which pedal ns the physical address lookup. This allows for multiple nodes to access each others' physical address spaces at will. A listener routine running on each node can process inbound memory access requests and perform not only address translation but also inter-node memory moves and lock acquisition/release on behalf of other nodes.

Figure 5:
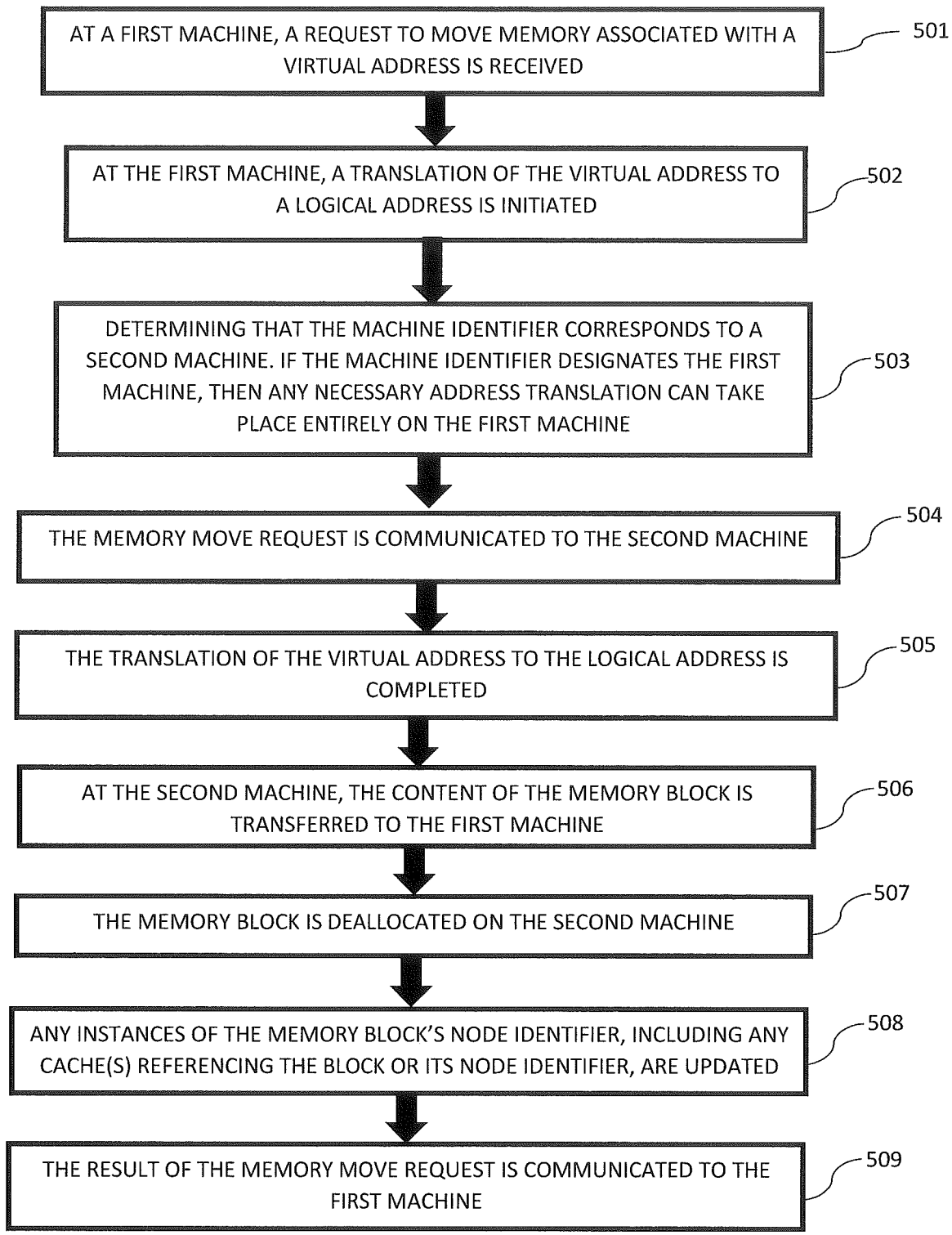
FIG. 5 exemplarily shows a high-level flow chart for an inter-node memory move 500 via a routine.

Referring now to FIG. 5, in some embodiments, steps 501-509 can arrange an inter-node memory move via a routine (i.e., similar to the realloc( ) routine in C/C++, except that this realloc( ) implementation can move a block node-to-node). In step 501, at a first machine, a request to move memory associated with a virtual address is received.

In step 502, at the first machine, a translation of the virtual address to a logical address is initiated.

In step 503, during the translation of the virtual address to the logical address in step 502, determining that the machine identifier corresponds to a second machine. If the machine identifier designates the first machine, then any necessary address translation can take place entirely on the first machine, and processing can continue at step 509.

In step 504, the memory move request is communicated to the second machine.

In step 505, the translation of the virtual address to the logical address is completed.

In step 506, at the second machine, the content of the memory block is transferred to the first machine.

In step 507, the memory block is deallocated on the second machine.

In step 508, any instances of the memory block's node identifier, including any cache(s) referencing the block or its node identifier, are updated.

In step 509, the result of the memory move request is communicated to the first machine.

Thus, steps 501-509 involve a distributed virtual address space for a distributed process. The steps 501-509 perform a node-to-node memory move where a node identifier is part of a virtual address.

From the perspective of high-level code running in a distributed process, this node-to-node move involves assigning a new address to the block as with an ordinary operation of the realloc( ) function operable in conventional C/C++ implementations to move a block from one address to another on a single node. In some embodiments, the underpinnings of the operation can involve passing a realloc( ) request from an initiating node to a node on which a block resides, where a listener routine performs the address translation needed to get a pointer to the block's content in physical memory. The listener routine also can arrange to copy that content to the initiating node so that the block will be recreated on the initiating node, and to then free the original memory range containing the block. Such a listener routine can run on every node in a distributed system and can include the functionality to recreate the moved block on the initiating node based on the content received from its original memory range. Embodiments may arrange a node-to-node move via an actual realloc( ) implementation extended to enable moving a block between nodes, or via an implementation of a different memory reallocation function or method extended to enable moving a block between nodes, or via a function or method expressly designed to move a block between nodes, or via any other function or method that may have reason to arrange such a move.

Figure 6:
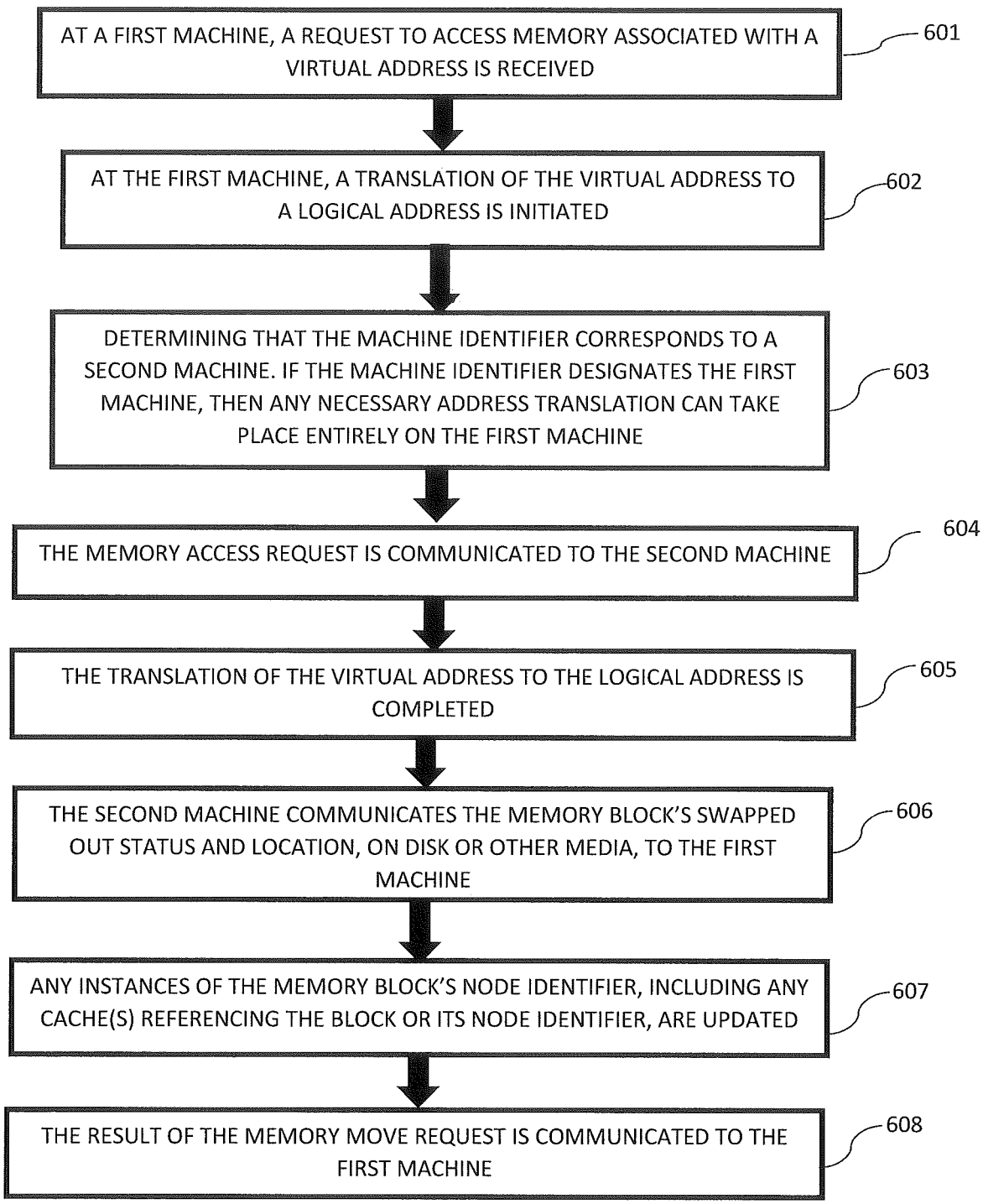
FIG. 6 exemplarily shows a high-level flow chart for an inter-node memory access 600 for a block that has been swapped out.

Referring now to FIG. 6, in some embodiments, steps 601-607 can arrange an inter-node memory access for a block that has been swapped out. In step 601, at a first machine, a request to access memory associated with a virtual address is received.

In step 602, at the first machine, a translation of the virtual address to a logical address is initiated.

In step 603, during the translation of the virtual address to the logical address in step 602, determining that the machine identifier corresponds to a second machine. If the machine identifier designates the first machine, then any necessary address translation can take place entirely on the first machine, and processing can continue at step 607.

In step 604, the memory access request is communicated to the second machine.

In step 605, the translation of the virtual address to the logical address is completed. If the virtual address corresponds to physical memory, then processing can continue as in FIG. 1, at step 106, without initiating an inter-node memory move.

In step 606, the second machine communicates the memory block's swapped out status and location, on disk or other media, to the first machine.

In step 607, any instances of the memory block's node identifier, including any cache(s) referencing the block or its node identifier, are updated.

In step 608, the result of the memory move request is communicated to the first machine.

Thus, steps 601-608 involve a distributed virtual address space for a distributed process. In the case where an inter-node memory access affects a swapped-out memory block, the steps 601-608 swap the block into local memory of the accessor node, effectively performing a node-to-node memory move.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
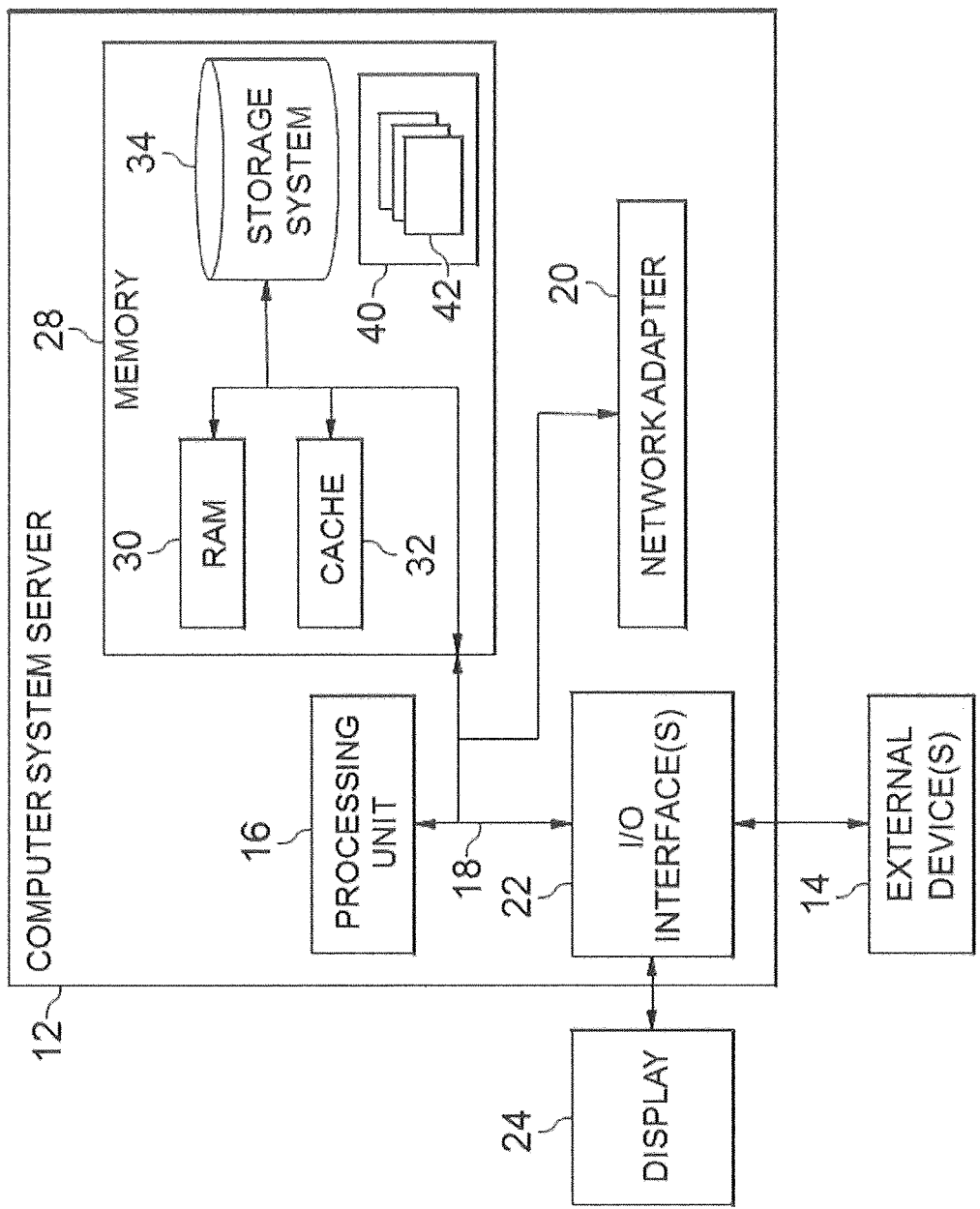
FIG. 2 depicts a cloud-computing node 10 according to an embodiment of the present invention.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 2, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
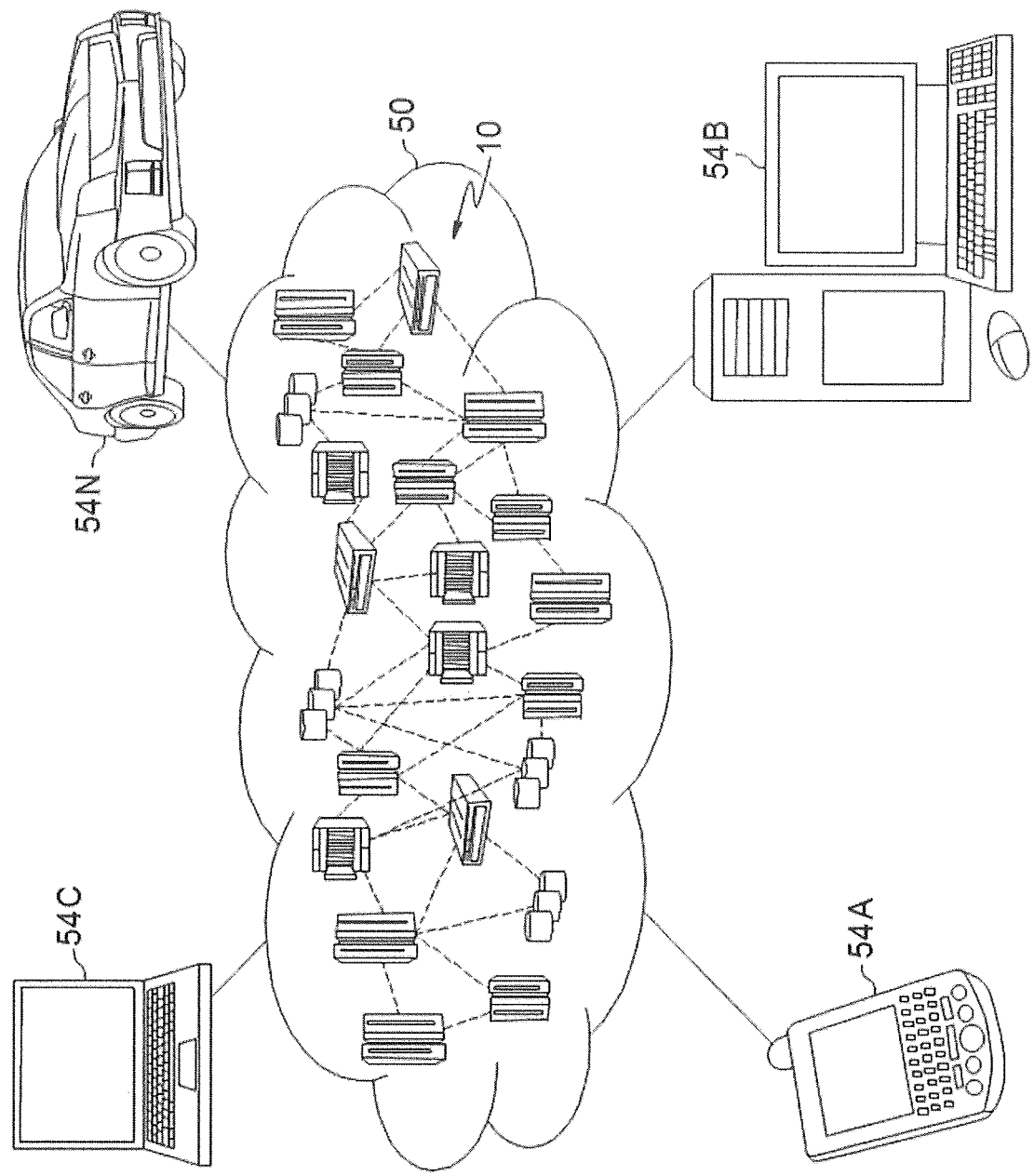
FIG. 3 depicts a cloud-computing environment 50 according to an embodiment of the present invention.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
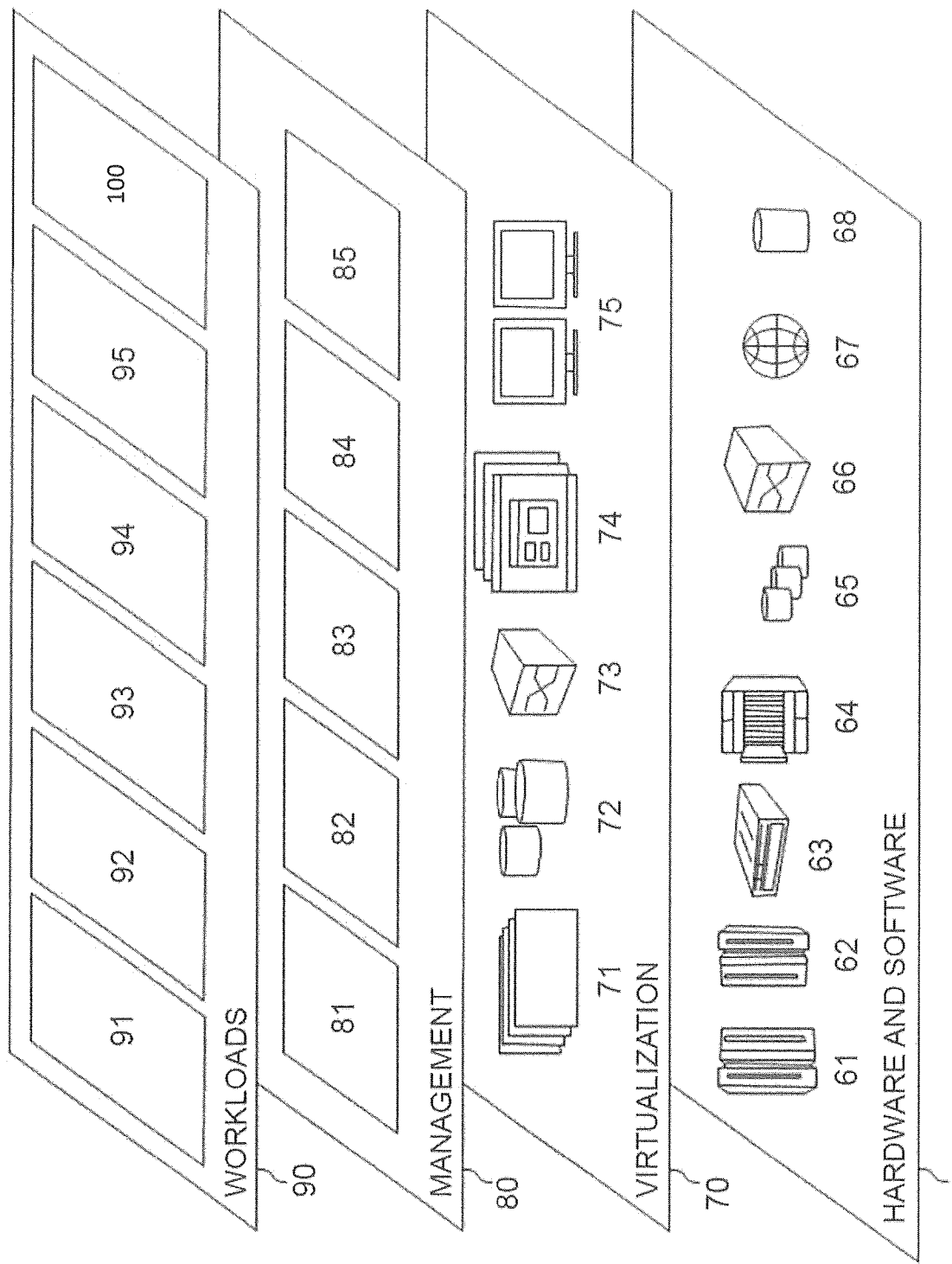
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual memory management method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented virtual memory management method, the method comprising:
   at a first machine, receiving a request to access memory associated with a virtual address comprising a machine identifier and an address of a location in a local virtual address space of a machine associated with the machine identifier;
   at the first machine, initiating a translation of the virtual address to a logical address including a physical address;
   during the translation of the virtual address to the logical address, determining that the machine identifier corresponds to a second machine;
   communicating the request to access the memory to the second machine based on the machine identifier; and
   at the second machine, fulfilling the memory access request,
   wherein the first machine and the second machine are independent of an operating system and of a specific address translation hardware used by nodes of a distributed system,
   wherein the first machine and the second machine are on heterogeneous systems including an independence of hardware device support and operating system support to thereby support virtual address translation,
   further comprising:
      generating an interrupt that serves to implement the virtual address translation across nodes when a virtual address corresponds to a remote node, which is handled by a service routine that determines communicating the memory access request to the remote node;
      performing a listener routine on the second machine to complete the inter-node request; and
      providing redundancy by associating a single node identifier with multiple redundant nodes,
   wherein every node that execute threads of the process agrees on the identity of every other node, so that the entire address space is accessible across all of the nodes via the virtual addresses consistent across all of the nodes.

2. The computer-implemented method of claim 1, further comprising completing the translation of the virtual address to the logical address after the communicating communicates the request to access the memory to the second machine.

3. The computer-implemented method of claim 1, further comprising communicating a result of the memory access request to the first machine.

4. The computer-implemented method of claim 1, wherein the translating performs the address translation at one of:
   a hardware;
   the operating system;
   a hypervisor; and
   an application layer.

5. The computer-implemented method of claim 1, wherein the request to access the memory is communicated using Ethernet protocol.

6. The computer-implemented method of claim 1, wherein the request to access the memory comprises a request to move a contents of the memory from the second machine to the first machine, and wherein the fulfilling the memory access request comprises allocating memory on the first machine, copying the contents of the memory from the second machine to the memory allocated on the first machine, and invalidating one or more references to the memory on the second machine in favor of the memory allocated on the first machine.

7. The computer-implemented method of claim 1, wherein the machine identifier is associated with a machine identification scheme that is common to both the first machine and the second machine.

8. The computer-implemented method of claim 1, embodied in a cloud-computing environment.

9. A computer program product for virtual memory management, the computer program product comprising a computer-readable storage medium having program instructions embodied therewith, the program instructions executable by a computer to cause the computer to perform:
   at a first machine, receiving a request to access memory associated with a virtual address comprising a machine identifier and an address of a location in a local virtual address space of a machine associated with the machine identifier;
   at the first machine, initiating a translation of the virtual address to a logical address including a physical address;
   during the translation of the virtual address to the logical address, determining that the machine identifier corresponds to a second machine;
   communicating the request to access the memory to the second machine based on the machine identifier; and
   at the second machine, fulfilling the memory access request,
   wherein the first machine and the second machine are independent of an operating system and of a specific address translation hardware used by nodes of a distributed system,
   wherein the first machine and the second machine are on heterogeneous systems including an independence of hardware device support and operating system support to thereby support virtual address translation,
   further comprising:
      generating an interrupt that serves to implement the virtual address translation across nodes when a virtual address corresponds to a remote node, which is handled by a service routine that determines communicating the memory access request to the remote node;
   performing a listener routine on the second machine to complete the inter-node request; and
   providing redundancy by associating a single node identifier with multiple redundant nodes,
   wherein every node that execute threads of the process agrees on the identity of every other node, so that the entire address space is accessible across all of the nodes via the virtual addresses consistent across all of the nodes.

10. The computer program product of claim 9, further comprising:
   completing the translation of the virtual address to the logical address after the communicating communicates the request to access the memory to the second machine; and
   communicating a result of the memory access request to the first machine.

11. The computer program product of claim 9, wherein the translating performs the address translation at one of:
   a hardware;
   the operating system;
   a hypervisor; and
   an application layer.

12. The computer program product of claim 9, wherein the request to access the memory is communicated using Ethernet protocol.

13. The computer program product of claim 9, wherein the request to access the memory comprises a request to move a contents of the memory from the second machine to the first machine, and wherein the fulfilling the memory access request comprises allocating memory on the first machine, copying the contents of the memory from the second machine to the memory allocated on the first machine, and invalidating one or more references to the memory on the second machine in favor of the memory allocated on the first machine.

14. The computer program product of claim 9, wherein the machine identifier is associated with a machine identification scheme that is common to both the first machine and the second machine.

15. A virtual memory management system, said system comprising:
a processor; and
a memory, the memory storing instructions to cause the processor to perform:
at a first machine, receiving a request to access memory associated with a virtual address comprising a machine identifier and an address of a location in a local virtual address space of a machine associated with the machine identifier;
at the first machine, initiating a translation of the virtual address to a logical address including a physical address;
during the translation of the virtual address to the logical address, determining that the machine identifier corresponds to a second machine;
communicating the request to access the memory to the second machine based on the machine identifier; and
at the second machine, fulfilling the memory access request,
wherein the first machine and the second machine are independent of an operating system and of a specific address translation hardware used by nodes of a distributed system,
wherein the first machine and the second machine are on heterogeneous systems including an independence of hardware device support and operating system support to thereby support virtual address translation,
the memory further storing instructions to cause the processor to perform:
generating an interrupt that serves to implement the virtual address translation across nodes when a virtual address corresponds to a remote node, which is handled by a service routine that determines communicating the memory access request to the remote node;
performing a listener routine on the second machine to complete the inter-node request; and
providing redundancy by associating a single node identifier with multiple redundant nodes,
wherein every node that execute threads of the process agrees on the identity of every other node, so that the entire address space is accessible across all of the nodes via the virtual addresses consistent across all of the nodes.

16. The system of claim 15, further comprising completing the translation of the virtual address to the logical address after the communicating communicates the request to access the memory to the second machine.

17. The system of claim 15, wherein the system is embodied in a cloud-computing environment.

* * * * *